United States Patent [19]

Rogers et al.

[11] Patent Number: 5,638,988
[45] Date of Patent: Jun. 17, 1997

[54] PARTICULATE DISPENSING SYSTEM

[75] Inventors: Kerry D. Rogers, Loveland; Warren L. Hammerbeck, Greeley; Joanne M. Hoyt, Loveland; Richard A. Beardmore, Windsor, all of Colo.

[73] Assignee: Loveland Industries, Inc., Greeley, Colo.

[21] Appl. No.: 577,381

[22] Filed: Dec. 22, 1995

[51] Int. Cl.⁶ ............................................. B65D 88/54
[52] U.S. Cl. .......................... 222/81; 141/330; 141/363; 222/88; 222/105; 222/325; 222/541.1; 229/122.2; 229/125.15; 414/412
[58] Field of Search ............................. 222/81, 83, 88, 222/325, 183, 185.1, 556, 541.1, 541.6, 541.9, 460; 414/412, 414; 141/330, 363, 364; 229/122.2, 125.15; 220/403, 404, 441, 462

[56] References Cited

U.S. PATENT DOCUMENTS

| 1,869,120 | 7/1932 | Thoeming et al. | 222/88 |
| 2,031,869 | 2/1936 | Trouth | 414/412 |
| 2,094,818 | 10/1937 | Rich et al. | 414/412 |
| 2,103,063 | 12/1937 | Clark | 222/325 |
| 2,107,995 | 2/1938 | Statham et al. | 222/83 |
| 2,306,426 | 12/1942 | Bundy | 414/412 |
| 2,398,405 | 4/1946 | Brooks | 222/88 X |
| 2,571,781 | 10/1951 | Sutch | 414/412 |
| 2,576,492 | 11/1951 | Vogel | 414/412 X |
| 2,686,625 | 8/1954 | Sundholm | 222/325 X |
| 3,107,822 | 10/1963 | Regenstein, Jr. | 222/325 X |
| 3,216,620 | 11/1965 | Laughlin | 222/105 X |
| 3,254,799 | 6/1966 | Gardner et al. | 222/88 |
| 3,405,844 | 10/1968 | Lenz et al. | 222/325 X |
| 3,409,177 | 11/1968 | Tschudy, Jr. | 222/325 X |
| 3,433,400 | 3/1969 | Hawkins | 222/183 X |
| 3,856,211 | 12/1974 | Williams | 222/81 X |
| 4,119,263 | 10/1978 | Cuthbertson et al. | 229/122.2 |
| 4,120,420 | 10/1978 | Dirksing | 222/88 |
| 4,265,584 | 5/1981 | Duwell et al. | 414/412 |
| 4,527,716 | 7/1985 | Haas et al. | 222/105 X |
| 4,548,351 | 10/1985 | Gusic | 229/125.15 X |
| 5,009,344 | 4/1991 | Cooley | 222/325 |

FOREIGN PATENT DOCUMENTS

WO94/07112  3/1994  WIPO.

*Primary Examiner*—Kevin P. Shaver
*Attorney, Agent, or Firm*—Lee R. Osman; Carol W. Burton; Holland & Hart LLP

[57] ABSTRACT

A dispensing system of the present invention includes a chute assembly and a rectangular container for dispensing of particulate material in the container. The chute assembly includes door and latch mechanisms which are opened to receive the rectangular container. Insertion of the rectangular container into the chute assembly automatically engages the latch mechanism, allowing the doors to open, which then engages a cutting subassembly of the chute assembly to open the container and expose the particulate contents for dispensing. The container includes an outer cardboard container, a cardboard insert having a wedge-shaped circumference at one end thereof, and a plasticized or foil liner. The container includes means for partially exposing the liner prior to insertion of the container into the chute assembly.

20 Claims, 7 Drawing Sheets

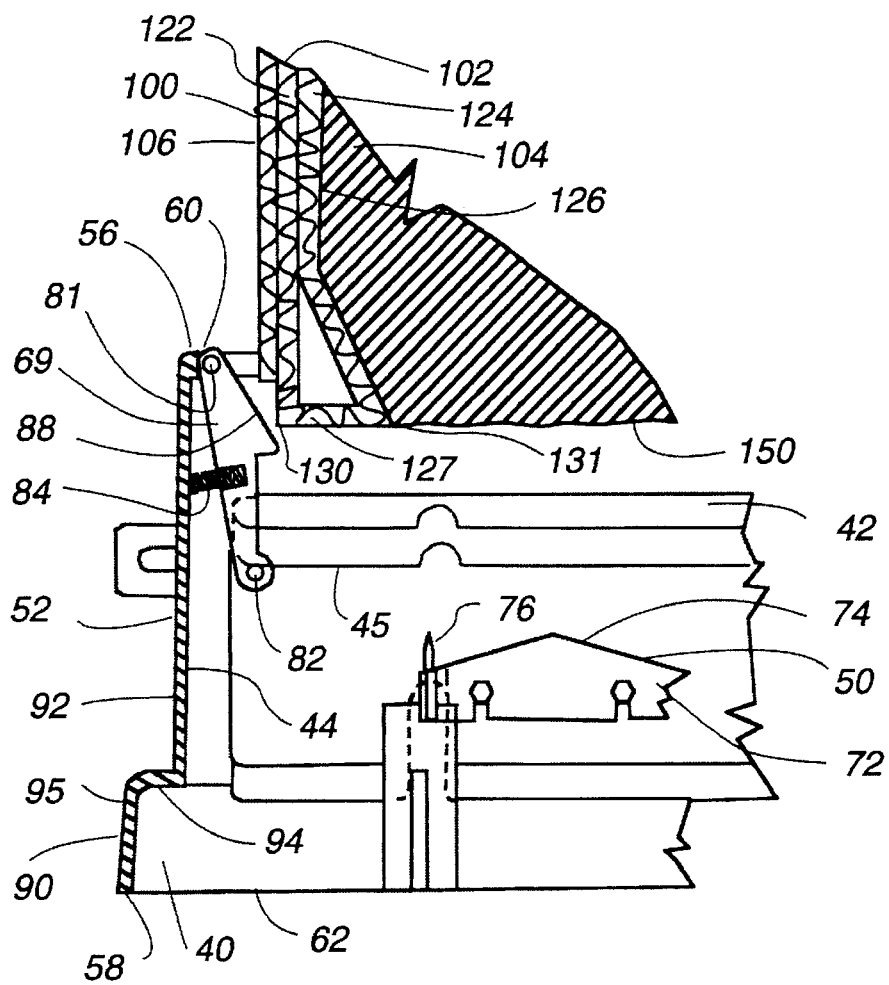
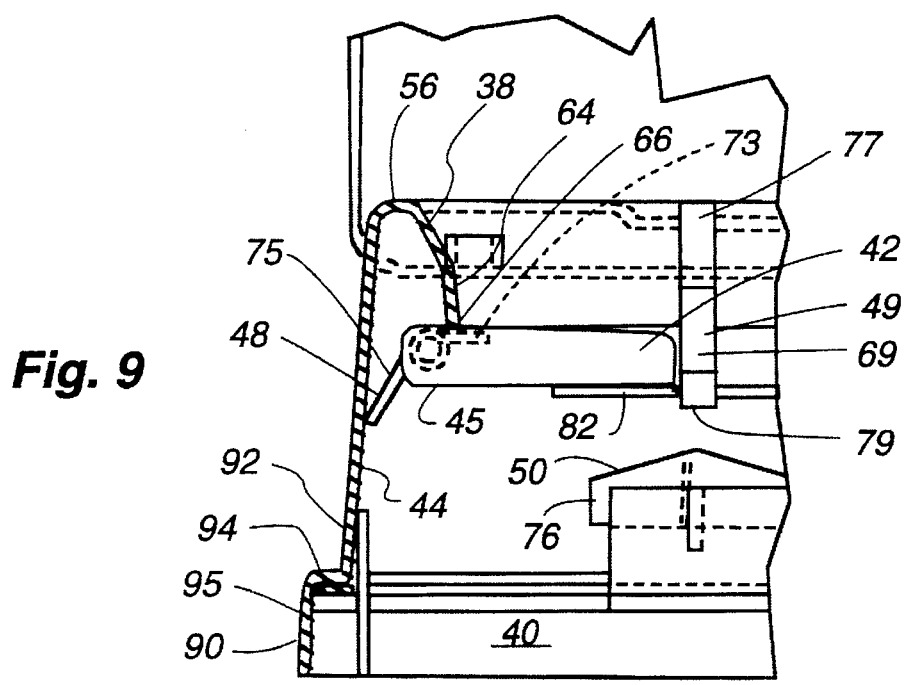

PARTICULATE DISPENSING SYSTEM

BACKGROUND OF THE INVENTION

1. Field of the Invention

This invention relates to a new and improved dispensing system for particulates, and more particularly to a dispensing system having a housing for receiving a partially opened container wherein the positioning of the container in the housing opens the housing to receive and facilitate the complete opening of the container to dispense the material from the container.

2. Description of the Prior Art

Particulates, such as solid fertilizer, chemicals, and other types of materials, are often handled and transported in bulky containers. The containers must be opened and emptied of their contents in order to utilize the particulates. Depending on the particular material and its intended application, the opening and emptying of the material container can be awkward and potentially hazardous to the health of the operator dispensing the material, and also potentially hazardous to the health of others who subsequently come in contact with the container.

There are several problems associated with the handling, opening, and emptying of containers containing such particulates. Exposure to the particulates stored in the material container during the handling, opening, and emptying of the container can be a serious problem, especially when the particulate is a pesticide, herbicide, or other hazardous material. Undesirable exposure can result from both handling the material and from breathing airborne particulates.

Several attempts have been made to develop both material containers and dispensing apparatus which allow for the safe and convenient handling, opening, and emptying of the material container. Problems associated with disposal of contaminated containers, risk of injury to operators from contact with hazardous materials or sharp apparatus components, and the need for specialized support components to prevent content spillage remain. For example, specialized pallets for shipment may be required, as is shown in U.S. Pat. No. 4,119,263 to Cuthbertson, et al. Examples of cutting devices used to open containers of particulates to expose the contents for dispensing are shown in U.S. Pat. No. 4,527,716 to Shaas, et al., and U.S. Pat. No. 2,094,818 to Rich, et al. Some such cutting devices may require separate manipulation by an operator to effectively open the container and discharge the material. U.S. Pat. No. 2,107,995 to Statham, et al., is exemplary of such an apparatus.

After particulates are dispensed, container disposal is problematic when particulates are toxic or otherwise hazardous. When containers are composed of a rigid-walled plastic material, collection and transport of bulky containers is costly and time-consuming. Incineration of such containers is typically impractical. Moreover, toxic residue would be expected to remain on the inner walls of such container, such containers must typically be thoroughly cleaned before recycling or discarding. The health risk associated with the handling and washing of empty containers can be problematic. In addition, government regulations can limit the recyclability of containers for certain materials. Moreover, the discarding of even cleaned containers is wasteful and environmentally unsatisfactory because of the lack of biodegradability of such containers. In some cases, this practice may be prohibited by law.

While it is known to utilize cardboard in the construction of containers to hold particulate matter for dispensing as described above, material wastage during the manufacture of containers to hold dispensable particulates has not heretofore been minimized. For example, approximately 13% of a rectangular sheet of cardboard is cut and discarded when the cardboard container 201 of U.S. Pat. No. 4,120,420 to Dirksing is manufactured. Given the increasing cost of forest products used to at least partially construct such containers, minimization of material wastage is desirable.

It is against this background that the significant improvements and advancement of the present invention have taken place in the field of particulate dispensing systems.

SUMMARY OF THE INVENTION

In accordance with its major aspects, a dispensing system of the present invention includes a chute assembly and a rectangular container received therein. The chute assembly includes door and latch mechanisms which are opened to receive the rectangular container. Insertion of the rectangular container into the chute assembly automatically engages the latch mechanism, which allows the doors to open, which then engages a cutting subassembly of the chute assembly to open the container and expose the particulate contents for dispensing.

The preferred container of the present invention includes an outer cardboard container, a cardboard insert having a wedge-shaped circumference at one end thereof, and a plasticized or foil liner. The preferred container includes means for partially exposing the liner prior to insertion of the container into the chute assembly of the present invention.

The present invention provides for a dispensing system which minimizes both direct physical contact with and inhalation of airborne particulates by an operator while opening and dispensing the contents of the container. After dispensing, the outer cardboard container and the cardboard insert can be flattened, and recycled or incinerated. The liner can be crushed and incinerated.

A more complete appreciation of the present invention and its scope can be obtained from understanding the accompanying drawings, which are briefly summarized below, the following detailed description of the presently preferred embodiments of the invention, and the appended claims.

BRIEF DESCRIPTION OF THE DRAWINGS

FIG. 8 is a representative partial section view of the particulate dispensing system shown in FIGS. 1–7, prior to complete insertion of the container into the chute assembly.

FIG. 9 is a representative partial section view of the particulate dispensing system shown in FIGS. 1–8, and illustrates the spring mechanism and cutting subassembly.

DETAILED DESCRIPTION OF THE INVENTION

1. General Description

Figure 1:
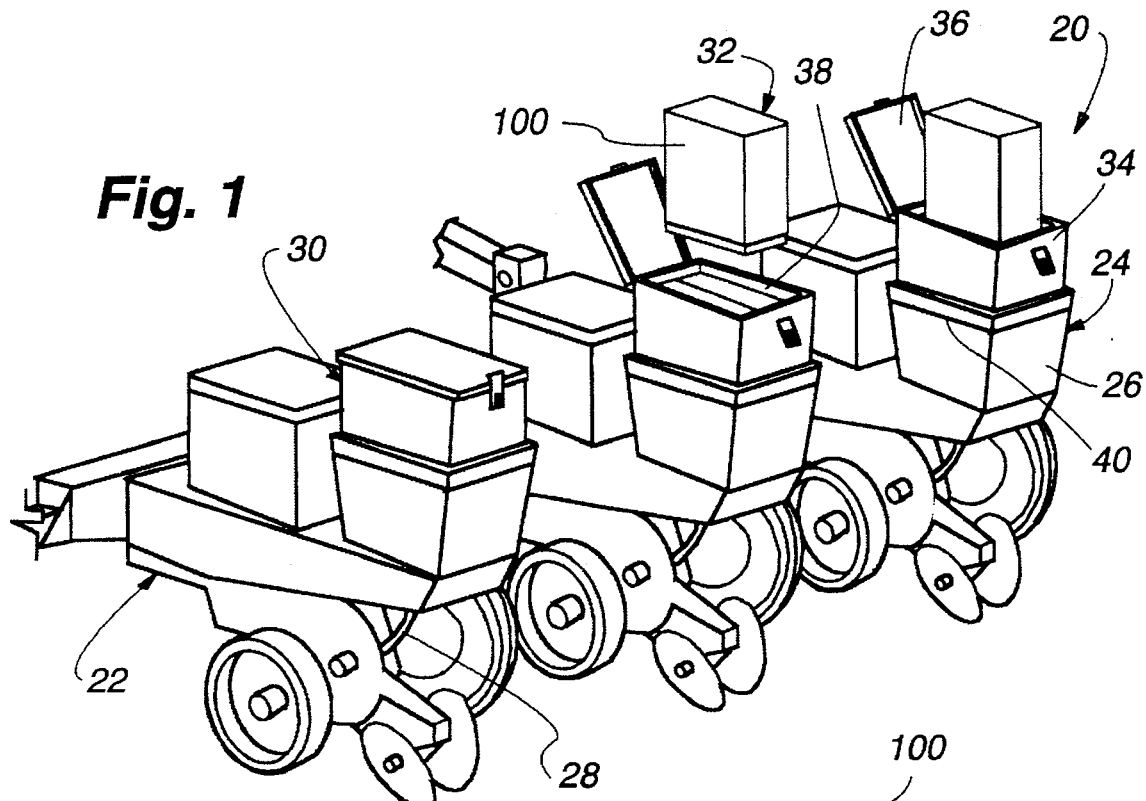
FIG. 1 is a perspective view of a planting attachment in which a preferred embodiment of the particulate dispensing system of the present invention is incorporated.

A preferred embodiment of the particulate dispensing system 20 of the present invention is best described with reference to the component parts of a planting attachment 22, as shown in FIG. 1, which is suitable for planting corn, soy beans or wheat. The particulate dispensing system 20 is sealingly mounted on a hopper 24 of the planting attachment 22. When the planting attachment 22 is attached to and pulled by a tractor (not shown) during planting, particulates contained in the dispensing system 20 are controllably dispensed through a passageway (not shown) in the body 26 of the hopper 24, though conduit 28, and onto the ground.

The particulate dispensing system 20 of the present invention includes a chute assembly 30 and a container 32. As may be seen in FIGS. 2–12, the chute assembly 30 includes a main body member 34, a lid 36, a top opening 38 and a bottom opening 40. The bottom opening 40 of the chute assembly 30 is placed adjacent to a top opening (not shown) of the hopper 24. The chute assembly 30 includes a pair of doors 42 adjacent the top opening 38 selectively positionable to cover the top opening 38 of the chute assembly 30 in a closed position (see FIGS. 2–6) and to reveal a passageway 44 of the chute assembly 30 defined by the main body member 34, when the doors 42 of the chute assembly 30 is in an open position (see FIG. 10).

The doors 42 each include a bottom layer 45, a longitudinal edge 46, and a top layer 47. The doors 42 are biased to the closed position by action of a spring 48 (see FIG. 6), in which position the longitudinal edges 46 are adjacent to one another. The doors 42 are releasably held in the closed position by a latch mechanism 49. A cutting subassembly 50 is positioned across the bottom opening 40 of the chute assembly 30. The cutting subassembly 50 is oriented so as to engage a portion of the container 32 when the container 32 is mounted into the chute assembly 30, which causes the container 32 to open, allowing the particulates stored therein (not shown) to be dispensed.

2. Chute Assembly

More specifically, and referring now to FIGS. 2–5, the main body member 34 of the chute assembly 30 of the present invention includes a pair of opposing end walls 52 interconnected by a pair of longitudinally oriented side walls 54. The main body member 34 defines a top surface 56 and a bottom surface 58. The top surface 56 defines an upper peripheral edge 60, which in turn defines the top opening 38. The bottom surface 58 defines a bottom peripheral edge 62, which in turn defines the bottom opening 40. The upper peripheral edge 60 extends inwardly from the end 52 and outer walls 54. A flange 64 depends downwardly from the upper peripheral edge 60 around the top opening 38, the flange 64 depending downwardly approximately one-quarter of the height of the end and side walls 52 and 54, and terminates in a bottom rim 66.

Figure 3:
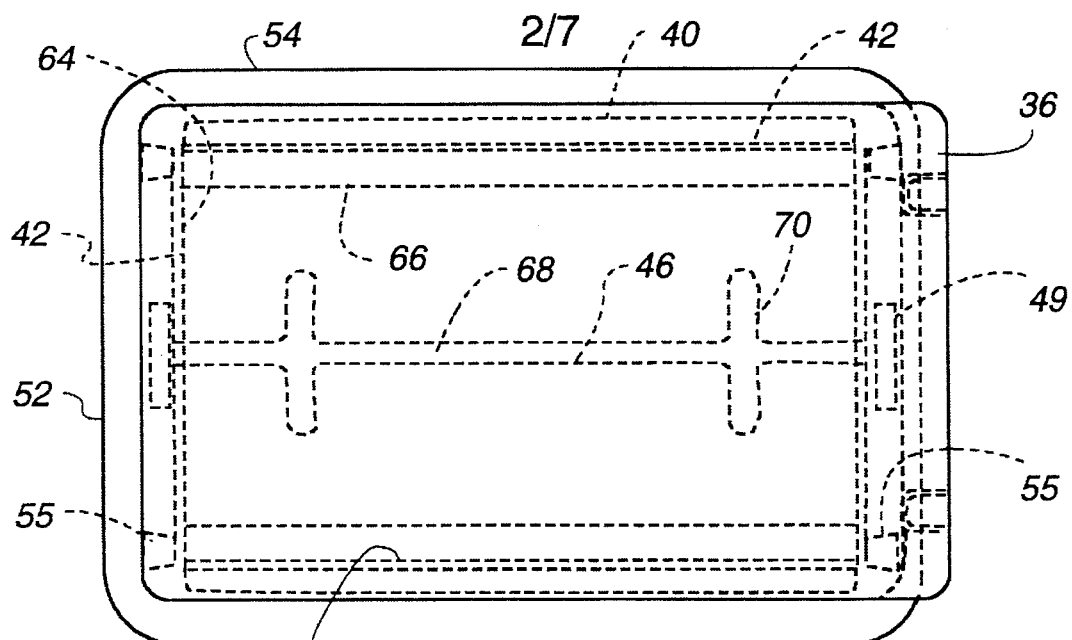
FIG. 3 is a top view of the chute assembly shown in FIGS. 1 and 2.
Figure 4:
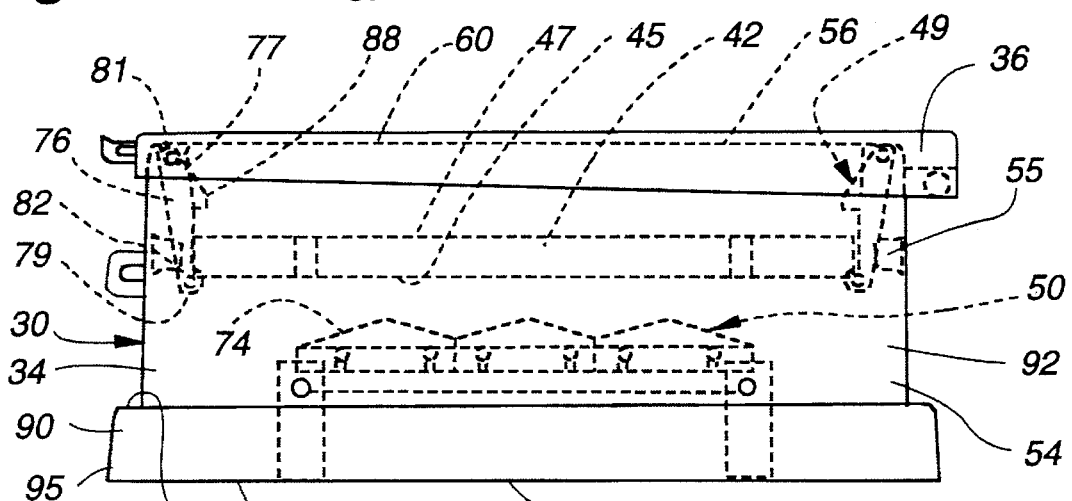
FIG. 4 is a side view of the chute assembly shown in FIGS. 1–3.
Figure 5:
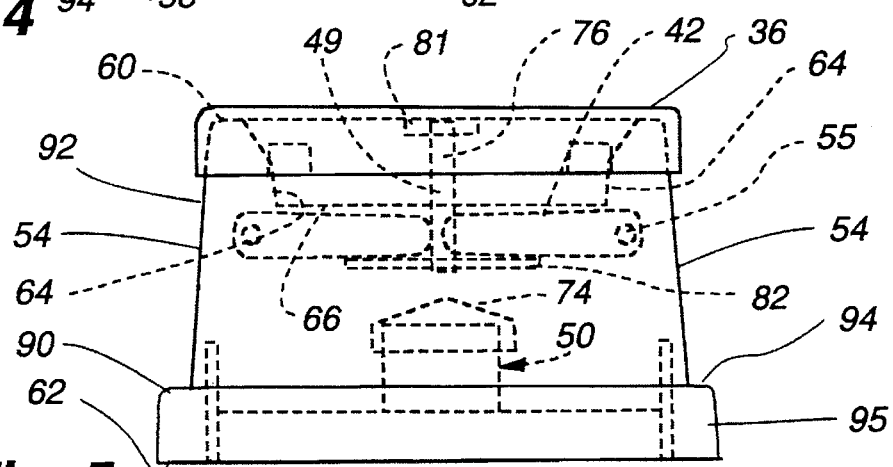
FIG. 5 is an end view of the chute assembly shown in FIGS. 1–4.
Figure 6:
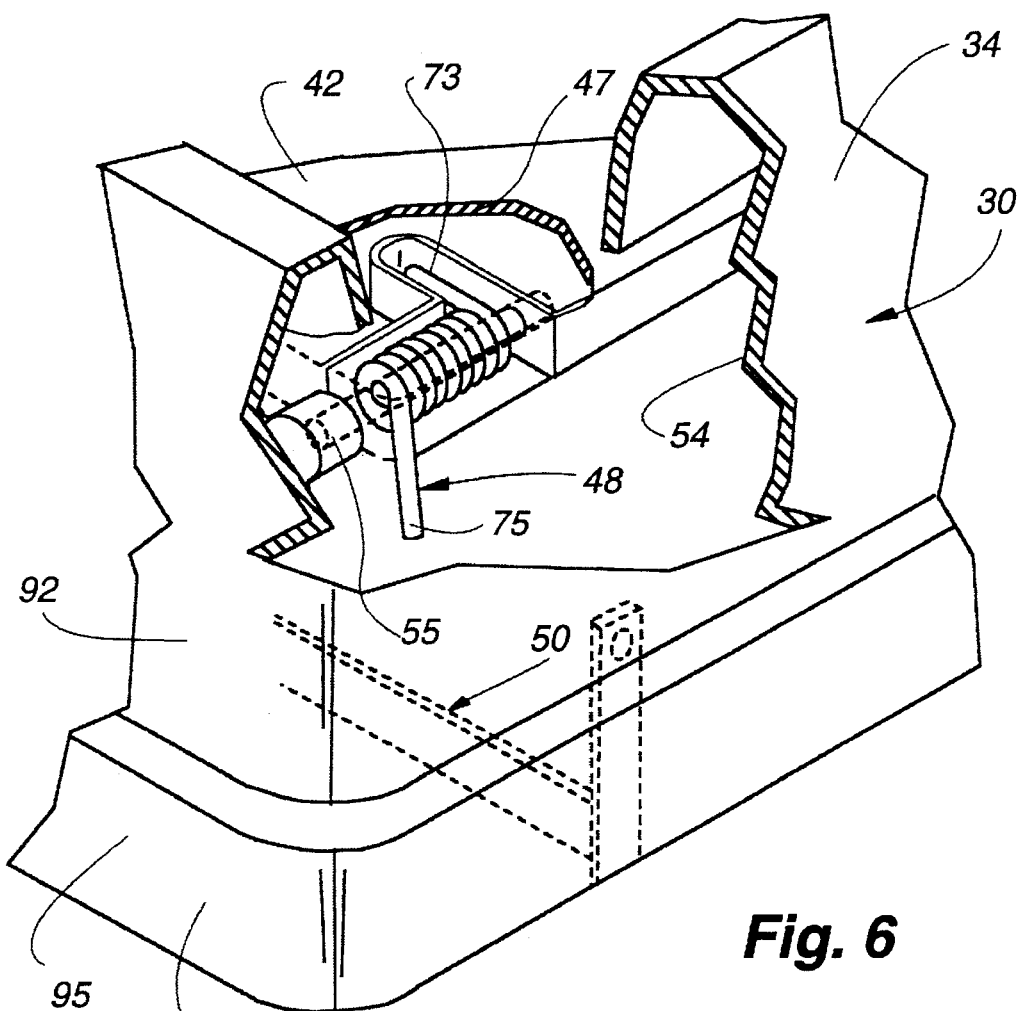
FIG. 6 is a partial perspective view of the chute assembly of the particulate dispensing system shown in FIGS. 1–5, with part of the chute assembly cut away to expose a spring mechanism of the chute assembly.

The pair of doors 42 are each pivotally connected to the end walls 52, adjacent to the bottom rim 66 of the flange 64. A pair of pivot pins 55 is pivotally fixed between the end wall 52 and the outer longitudinal edge 57 of the door 42 at either end of the door, as shown in FIGS. 3, 5 and 6. The pivot pin 55 is pivotally fixed to the end wall 52 near the intersection of the end wall 52 and the outer wall 54. The doors 42 pivot about the pivot pins 55 between the closed and open positions. In addition, the doors 42 are thus offset downwardly from the top surface 56 of the chute assembly 30.

A gap 68 is formed between the longitudinal edges 46 of the doors 42, and slots 70 are formed in each of the doors 42 extending transversely from the longitudinal edges 46, the slots 70 of each door 42 being co-extensive with the corresponding slots 70 in the other door 42.

The doors extend substantially across the top opening 38 of the chute assembly when in the closed position, and extend downwardly along the respective sidewall 54 when in the open position, as is described in more detail below.

Figure 10:
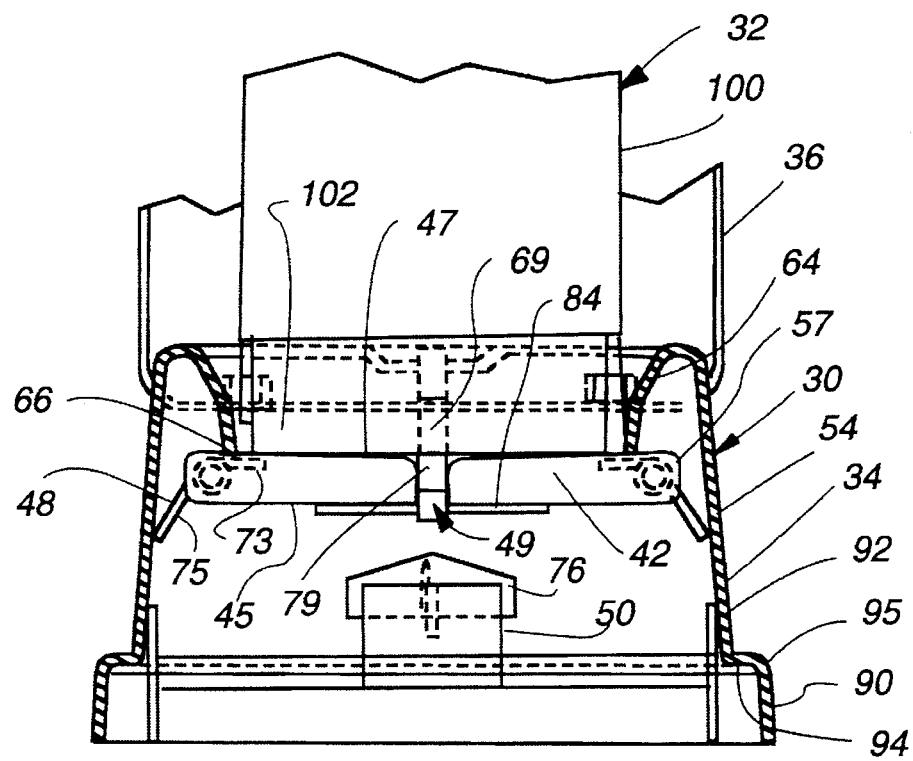
FIG. 10 is a partial section view of the particulate dispensing system shown in FIGS. 1–9, prior to complete insertion of the container into the chute assembly.
Figure 11:
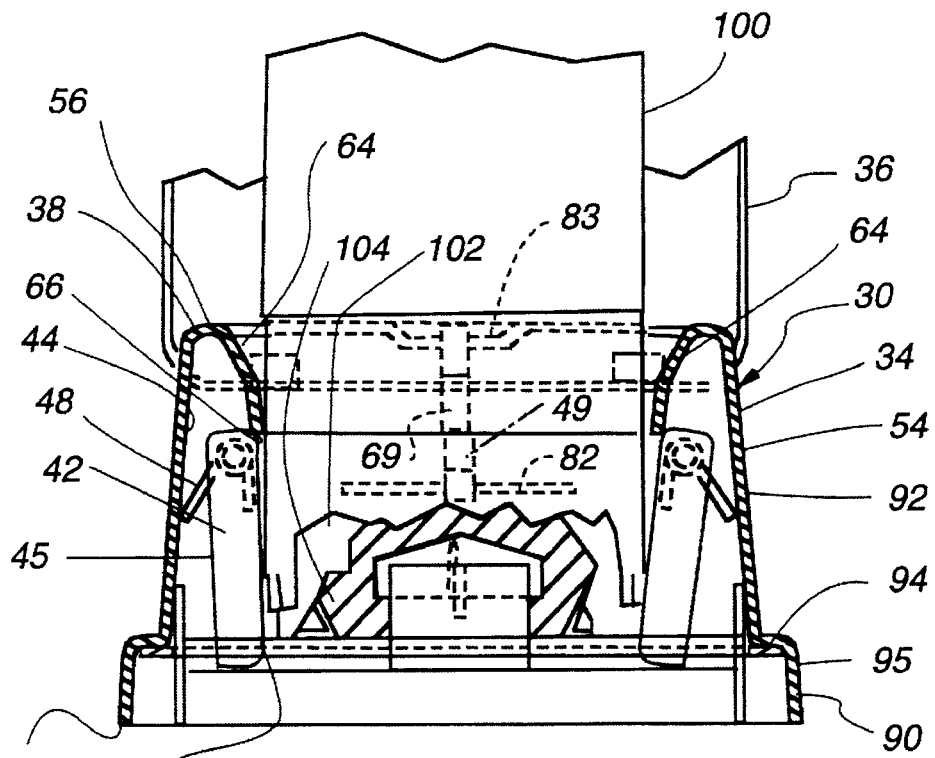
FIG. 11 is a partial section view of the particulate dispensing system shown in FIGS. 1–10, showing engagement of the container with the cutting subassembly of the chute assembly shown in FIGS. 1–10.
Figure 12:
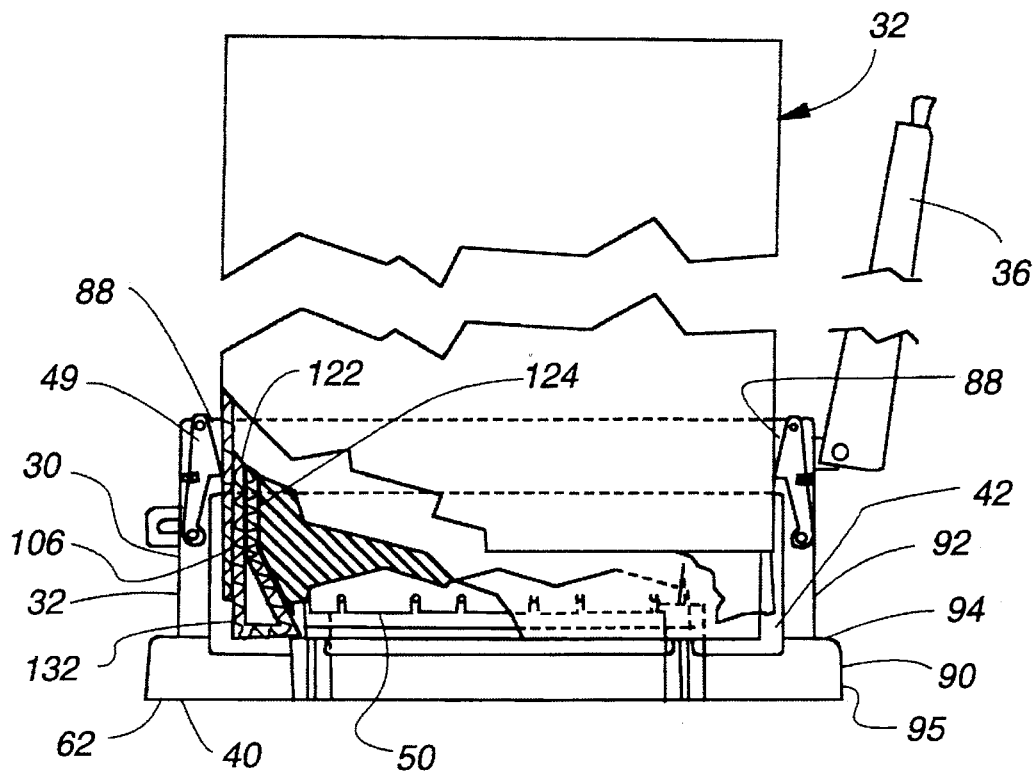
FIG. 12 is a representative partial section view of the particulate dispensing system shown in FIGS. 1–11, after insertion of the container into the chute assembly is complete.
Figure 13:
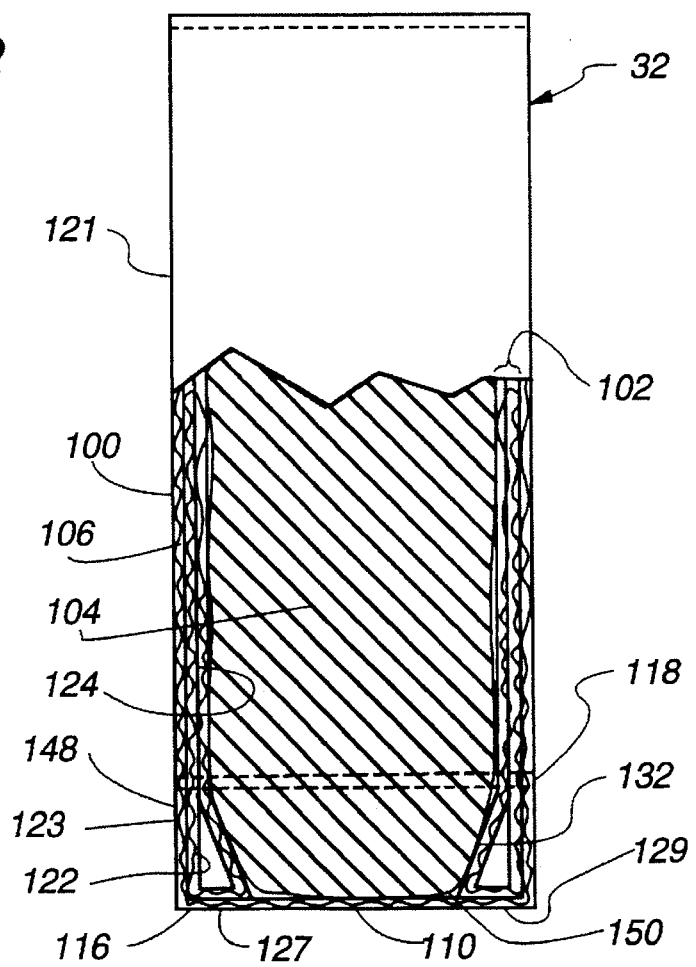
FIG. 13 is a partially exposed side view of the container of the particulate dispensing system shown in FIGS. 1 and 2.

The doors are biased to the closed position, shown in FIGS. 2–6, by a spring 48 positioned on the pivot pin 55 and having one leg 73 extending between the bottom layer 45 and the top layer 47, and engaging the top layer 47 of the door 42, and a second leg 75 engaging the sidewall 54 (See FIGS. 6 and 9). The spring 48 can be mounted on each pivot pin 55, or on just one per door 42. The spring 48 is designed to bias the doors 42 to the closed position in which the doors are at approximately a 90° angle with the sidewall 54. The top layer 47 of the doors 42 engage the rim 66 of the flange 64 to keep the doors from pivoting even further upwardly, as best shown in FIG. 6 and 9. When in the closed position, while overall the doors 42 are substantially perpendicular to the sidewalls 54, the top layer 47 of the doors 42 slope slightly downwardly towards the gap 68 between the longitudinal edges 46, as best seen in FIGS. 9 and 10. The slope allows any particulate material remaining on the doors 42 when the doors are in the closed position to move toward and fall through the gap 68, into the hopper 24. The spring 48 allows the doors 42 to pivot to the open position and extend downwardly along the sidewalls 54, while continuously biasing the doors 42 to the closed position such that when the force keeping the doors 42 in the open position is removed, the doors 42 automatically pivot back to the closed position.

The cutting subassembly 50, shown in FIGS. 4, 5, and 7–12, is positioned inside the passageway 44 of the chute assembly 30 adjacent the bottom opening 40. The cutting subassembly 50 includes a plurality of longitudinal blades 72 which project upwardly into the passageway 44. The cutting subassembly 50 also includes a pair of opposing end blades 76, each positioned perpendicularly and adjacent to opposite ends of the longitudinal blades 72. The end blades 76 are positioned to fit under the slots 70 when the doors 42 are in a closed position, and when the doors 42 are moved into the open position, slots 70 pass over the end blades 76, as described in more detail below. Thus, the configuration of slots 70 prevents the end blades 76 from interfering with the movement of the doors 42, thereby allowing the doors 42 to open fully and extend substantially directly downwardly, as required. Preferably, the longitudinal blades 72 and opposing end blades 76 collectively define a cutting edge 74 which extends substantially the length of the chute assembly 30.

The latch mechanism 49 includes a pair of elongated main body members 69 each pivotally attached at its top end 77 to the upper peripheral edge 60 adjacent the top opening 38. The main body members 69 are positioned at opposing ends of the gap 68 formed between the longitudinal edges 46 of the doors 42. The main body members 69 are pivotally attached to the edge 60 by a pivot pin 81 extending through their top ends 77 and received in corresponding recesses 83 formed in the chute assembly 30.

Figure 2:
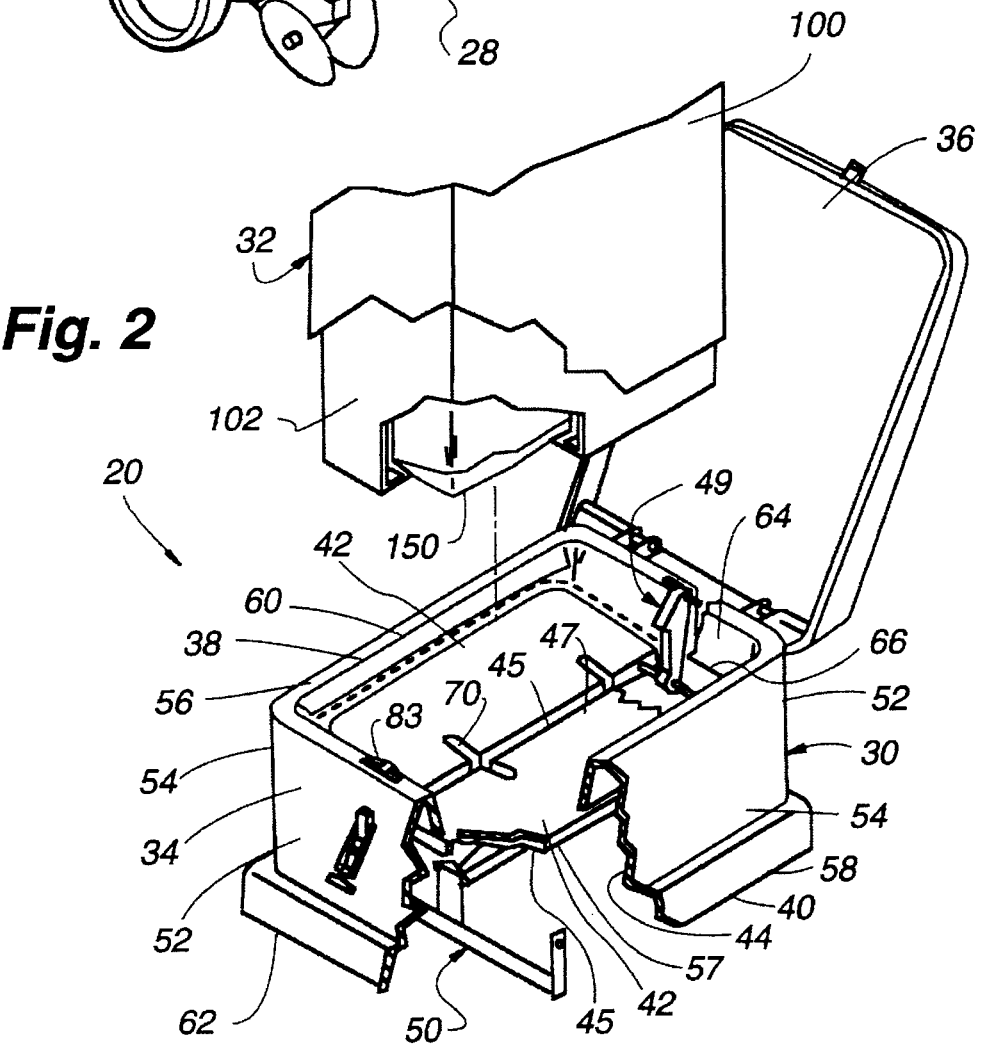
FIG. 2 is a perspective view of the chute assembly and container component of the particulate dispensing system shown in FIG. 1, with part of the chute assembly cut away to expose a latch mechanism and cutting subassembly of the chute assembly, and part of the container cut away to expose an insert and liner of the container.
Figure 7:
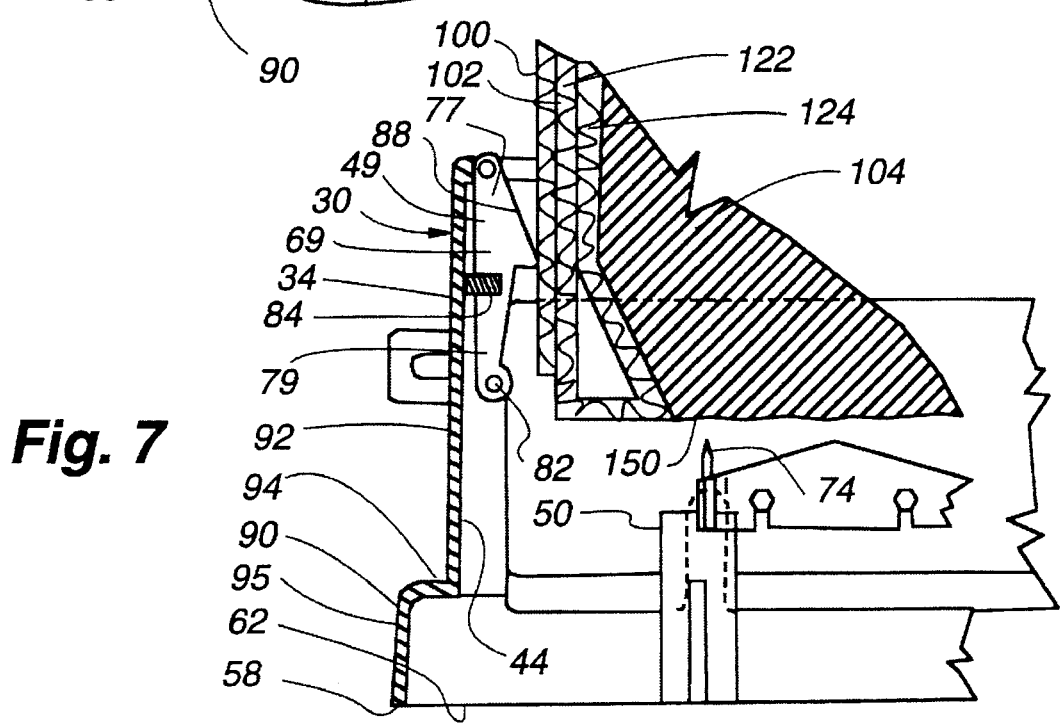
FIG. 7 is a representative partial section view of the particulate dispensing system shown in FIGS. 1–6, prior to complete insertion of the container into the chute assembly.

The main body members 69 each extend downwardly and slightly inwardly through the gap 68 formed between the doors 42. A cross bar 82 is mounted through each of the bottom ends 79 of the main body members 69. With the doors 42 in the closed position, the main body members extend through the gap 68, and the cross bars 82 engage the bottom layer 45 of each of the doors 42, thus restricting the downward movement of each of the doors 42 when the doors are in the closed position. This is considered the upper position for the main body member 69, see FIGS. 2, 4, 5, 8 and 9. The main body members 69 can pivot about their top ends 77 downwardly and outwardly to no longer extend through the gap 68, disengaging the cross bar 82 from the bottom layer 45 of the doors 42, for instance as shown in FIGS. 2 and 7. When the cross bar 82 is disengaged from the bottom layer 45 of the doors 42, the doors are able to pivot downwardly to the open position. The main body members 69 of the latch mechanism 49 must extend substantially downwardly adjacent to the end walls 52, the lower position, in order for the doors 42 to pivot to the open position.

Each main body member 69 is biased to the upper position (FIGS. 2, 4, and 5) in contact with the bottom layer 45 of each of the doors 42 by a coil spring 84 positioned between the end wall 52 and the main body member 69, as best shown in FIGS. 7 and 8. The spring 84 biases the main body member 69 to the upper position to insure engagement between the cross bars 82 and the bottom layers 45 of the doors 42 when the doors are in the closed position. When the main body member 69 is pivoted to the lower position, the spring 84 is compressed, as seen in FIG. 7. When the doors are moved to the closed position, the spring extends to bias the main body member 69 into the upper position. Thus, the doors are automatically releasably maintained in the closed position by the latch mechanism 49. This helps insure that the doors 42 cannot be easily opened to give access to the blade assembly 50, as will be described hereinafter.

A cam surface 88, best shown in FIGS. 7 and 8, is formed on the inwardly facing surface 85 of each of the main body members 69 to facilitate moving the main body members from the upper position to the lower position, in order to allow the doors 42 to pivot to the open position. The cam surface 88 slopes downwardly and inwardly from the top end 77 to the bottom end 79 of the main body member 69, thus increasing the width of the main body member from the top end 77 to the bottom end 79. When the container 32 is inserted into the chute 30, the container 32 engages the cam surface 88 on each main body member 69, and as the container is lowered, gradually pivots the main body members 69 from the upper position to the lower position by the time the container 32 reaches the doors 42, to allow the doors 42 to pivot to the open position. This will be explained in more detail below.

A bottom portion 90 of the body member 34 of the chute assembly 30 extends outwardly and downwardly from the upper portion 92 of the body member 34 to form a ledge 94 and a skirt 95. The ledge 94 engages a top edge (not shown) of the hopper 24 to seat the chute assembly 30 on top of the hopper 24, aligning the passageway 44 of the chute assembly 30 with the passageway (not shown) of the hopper 24. The skirt 95 extends down around the top of the hopper 24.

3. Container

The container 32 of the dispensing system 20 of the present invention, as shown in FIGS. 2, 7, 8, 14 and 15, has a parallelpiped shape, and includes an outer container 100, an insert 102, and a liner 104. The insert 102 is sized to snugly fit into the outer container 100, and the liner 104 is sized to snugly fit into the insert 102. The liner 104 is formed into a bag-like shape and is preferably constructed of a plasticized foil or a nylon/poly material, most preferably a nylon/poly material having desired tear characteristics.

The outer container 100 includes four side walls 106, an upper end wall 108 and a lower end wall 110, collectively defining an interior chamber 112. The four side walls 106 abut the upper end wall 108 at an upper edge 114 and abut the lower end wall 110 at a lower edge 116. Formed in the four side walls 106 are perforations 118 continuous around the container 100, under which and coextensive to a strip 120 is mounted. The perforations 118 and strip 120 are generally positioned parallel to each of the upper and lower edges 114 and 116, closer to the lower edge 116 and farther from the upper edge 114, and defining thereby upper and lower portions 121 and 123 of the outer container 100.

The insert 102 includes four outer insert walls 122, four inner insert walls 124, an open top 125 and a bottom surface 127. The four outer insert walls 122 and four inner insert walls 124 define an insert passageway 126 between an upper insert edge 128 and a lower insert edge 130. The inner insert walls 124 are folded to form four wedge portions 132 which circumscribe the lower insert edge 130 and define an inner perimeter edge 131, and also comprise the bottom surface 127. The inner perimeter edge 131 defines an aperture 129. The perimeter edge 131 typically defines an aperture 129 having a rectangular shape.

Figure 14:
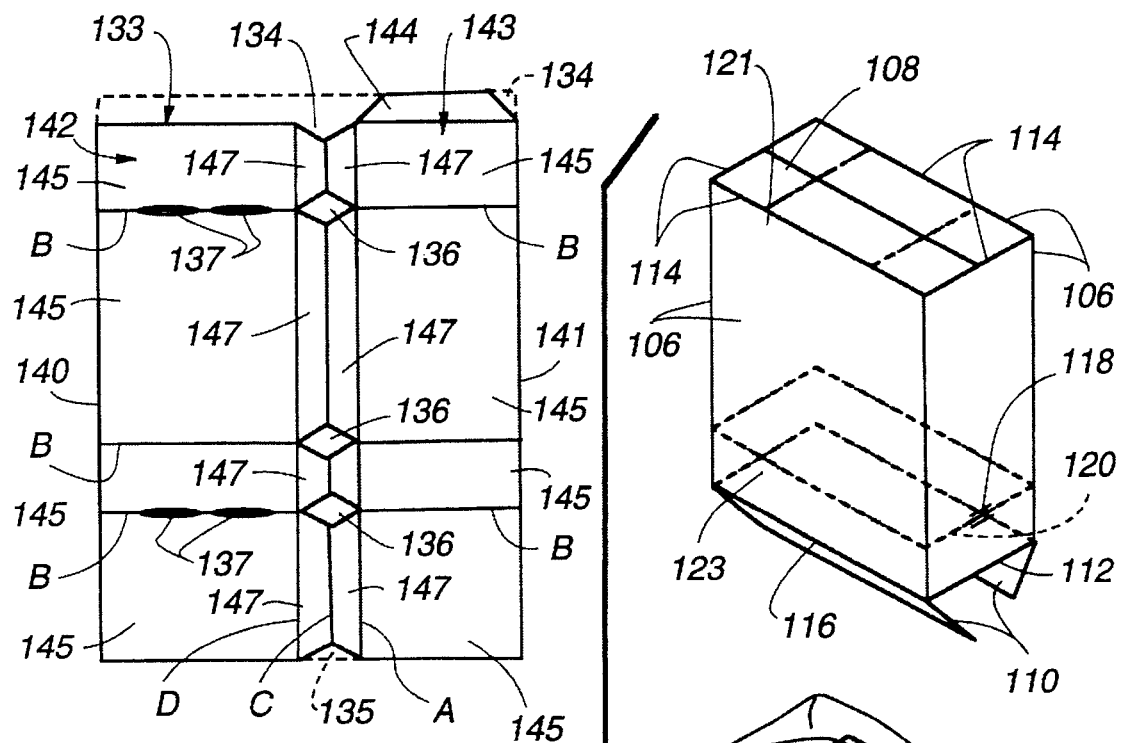
FIG. 14 is a plan view of an unfolded insert component of the container shown in FIGS. 1, 2 and 13.
Figure 15:
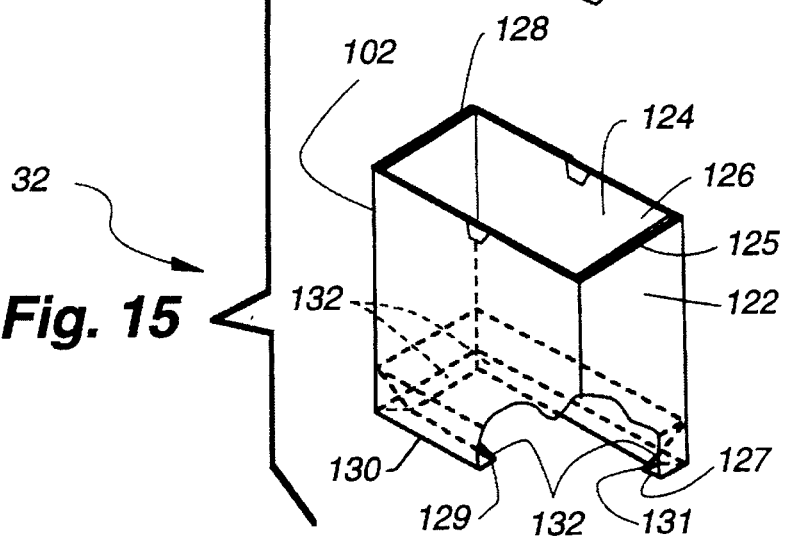
FIG. 15 is an exploded view of the outer container, liner, and insert components of the container shown in FIGS. 1, 2, 13 and 14.

Referring now to FIG. 14, the insert 102 is preferably constructed from a single sheet 133 of cardboard, with notches 134 and 135, and holes 136 and 137 formed in the sheet 133. Collectively, the notches 134 and 135 and holes 136 and 137 preferably represent less than 6% of the surface area of the sheet 133.

Sheet 133 is divided longitudinally into sections 142 and 143 along line "A", with section 142 being slightly larger than section 143. Each of sections 142 and 143 are further divided into panels 145 by fold lines "B". The panels 145 on section 142 each correspond to a particular panel 145 on section 143. The panels 145 of section 142 become the inner walls 124 of the insert 102, and the panels 145 of section 143 become the outer walls 122 of the insert 102. Section 142 defines additional fold lines "C" and "D" that run parallel to fold line "A" and define panels 147 (between lines "A" and "C") and panels 149 (between lines "C" and "D") in conjunction with fold lines "B". The panels 147 and 149 become the four wedge portions 132 which circumscribe bottom insert edge 130, and define the aperture 129, as described above.

To form the insert 102, sections 142 and 143 are first folded along line "A" to overlap the panels 145 of section 143 with the panels 145 of section 142. The opposing edges 140 and 141 of the sheet 133, are folded to meet, defining thereby the upper insert edge 128. The panels 145 of section 142 of the sheet 133 form the inner insert walls 124, and panels 145 of section 143 of the sheet 133 form the outer insert walls 122. The coextending sections 142 and 143 are then folded along lines "B" to define the parallelpiped shape. Flap 144 is secured to the adjacent panel to fix the shape of the insert. Because free edge 140 of section 142 and the free edge 141 of section 143 are aligned to be adjacent to one another and section 142 is wider than section 143, the panels 147 and 149 form a triangular structure, with the panel 147 formed between lines "A" and "C" defining the bottom surface 127 of the insert 102, and the panels 149 defining the wedge portions 132. Fold line "A" forms lower insert edge 130, and fold line "C" forms the inner perimeter edge 131 which defines the aperture 129.

The liner 104 and its contents conform to the shape of the passageway 126 of the insert 102, rests upon the wedge-shaped portions 132, and spans the aperture 129. The wedge-shaped portions 132 create a funnel at the bottom of the insert 102 so there are no corners or ledges in the liner 104 to trap particulate material as it flows out of the liner.

The container 32 is assembled by closing the lower end wall 110 of the outer container 100, inserting the folded insert 102 into the chamber 112, and placing the empty liner 104 into the passageway 126 of the insert 102. The liner 104 is then filled with a predetermined amount of a particulate material and sealed. Typically, the container is designed to hold forty pounds of particulate material. The upper end wall 108 of the outer container 100 is then sealed shut. At this point, a bottom portion 148 of the container 32 includes the lower portion 123 of the outer container 100, the wedge-shaped portion 132 of the insert 102, the aperture 129 defined in the bottom surface of insert 102, and the bottom 150 of the liner 104.

The chute assembly is preferably designed to allow easy and efficient emptying of the particulates from a container 32 into the hopper 24. In addition, the chute assembly 30 is also designed to dissuade the user to not transport a container 32 in the chute assembly 30 while the planting attachment 22 is in use. If a container 32 is placed in the chute assembly 30 and then transported on the planting attachment 22, the container 32 is likely to fall from the chute assembly 30 and the planting attachment 22 onto the ground, creating spillage and waste, and possibly injuring a bystander.

A user is motivated to transport an extra container 32 in the chute assembly 30 in order to effectively load two times the amount of particulate matter into the hopper 24. Loading an extra container 32 into the chute assembly 30 would replenish the particulate material in the hopper 24 because the particulate matter leaving the hopper 24 would be replaced by the particulate matter in the extra container 32.

The dimensions of the chute assembly 30 are designed to dissuade the user from placing an extra container 32 in the chute assembly 30 for transport during use. The height of the chute assembly 30 is minimized so that when the container 32 is inserted into the passageway 44 of the chute assembly 30, the container 32 is positioned adequately to empty its contents into the hopper 24, but is not sturdy enough to be transported on the planting attachment 22 in that inserted position. The height of the chute assembly 30 has to be sufficient to allow the doors 42 to clear the cutting subassembly 50, and to provide an adequate seal around the container 32 by the chute assembly 30 extending a small distance above the doors 42, as described above.

Based on the width of the container 32 and the size of the hopper 24, the chute assembly 30 must have a certain sized opening 38 to accommodate the container 32. The doors 42, in turn, must have a sufficient width to span the opening 38 in the chute assembly 30 when in the closed position, yet must be able to pivot to the fully open position to receive the container 32 in the chute assembly 30. Given the placement of the cutting subassembly 50, the slots 70 must be formed in the doors 42 to allow the doors to pass by the cutting subassembly 50 to fully open. The height of the chute assembly 30 is increased a small amount to extend upwardly a short distance from the position of the doors 42 in order to form an adequate seal around the container 42 to minimize the escape of particulate matter during emptying.

The minimized height of the chute assembly 30 dissuades users from transporting an extra container 32 since the height of the chute assembly would make the extra container likely to topple off of the chute assembly 30 and onto the ground. This feature will help avoid spillage of the particulate material in the container 32, as well as potential injury to bystanders.

4. Assembly

To assemble the particulate dispensing system 30 of the present invention, the bottom portion 123 of the outer container 100 is first removed by pulling the strip 120 across the perforation 118 around the entire container, and separating the bottom portion 123 of the outer container 100 from the upper portion 121 of the outer container 100, thereby exposing the bottom 150 of the liner 104 through the aperture 129 in the insert 102. The liner 104 is manufactured from material of sufficient strength to support the particulates contained therein without ripping or tearing. In addition, the wedge-shaped portions 132 of the insert 102 keep the liner 104 and its contents from sliding out of the insert passageway 126 through the aperture 129. Thus, the integrity of the container 32 and its contents are not affected by the removal of the lower portion 123 of the outer container 100.

The container 32 is then positioned in the chute assembly 30, which has previously been positioned to sit on top of and sealingly engage the hopper 24. The container 32 is positioned over the top opening 38 of the chute assembly 30, with the lower edge 116 of the outer container 100 co-extensive with the top opening 38. The bottom 150 of the liner 104 faces downwardly. The side walls 106 of the container 32 engage the cam surfaces 88 of the main body members 69 of the latch mechanism 49.

As the container 32 moves downwardly into the chute 30 and before then container 32 contacts the doors 42, the side walls 106 engage the cam surfaces 88, causing the main body members 69 of the latch mechanism 49 to pivot outwardly and downwardly, thus disengaging the cross bars 82 on the main body members 69 from the bottom layers 45 of the doors 42. The container 32 then engages the doors 42, which are then forced against the bias of spring 48 to the open position by the weight and downward movement of the container 32.

The container 32 and its contents then slide downwardly through the passageway 44, falling under the force of gravity and engaging the cutting subassembly 50.

The blades 72 and 76 of the cutting subassembly 50 fit within the aperture 129 formed in the bottom surface 127 of the liner 102, and tear an opening 152 in the liner 104, exposing the particulate material contained therein. The particulate material falls through the opening 152 in the liner 104, past the cutting subassembly 50, through the bottom opening 40 of the chute assembly 30 and into the hopper 24.

The wedge-shaped portions 132 of the insert 102 facilitate the flow of particulate material out of the container 30 and into the hopper 24. The shape of the cutting subassembly 50, with its longitudinally extending cutting blades 72 and transverse end blades 76, slices a sufficiently large opening 152 in the liner 104 to prevent the liner 104 from interfering with the dispensing of particulate material. Moreover, the seal achieved between the bottom peripheral edge 62 of the chute assembly 30 and the hopper 24, together with sealing engagement of the side walls 106 of the outer container 100 with the upper peripheral edges 60 surrounding the top opening 38 of the chute assembly 30, provide for a substantially dust free discharge of particulate material into the hopper 24.

After the particulate material has been dispensed from the container 32 into the hopper 24, the container 32 is removed from the chute assembly 30 by grasping the outer container 100 and lifting the container 32 out of the chute assembly 30. As the container 32 is removed from chute assembly 30, the doors 42 move from the open position to the closed position under the spring bias force of the spring 48, as explained above. As the container 32 is disengaged from the cam surfaces 88 on the main body member 69 of the latch mechanisms 49, the main body members 69 pivot upwardly and inwardly through the gap 68 such that the cross-bars 82 re-engage the bottom layers 45 of the doors 42. The doors 42 are thereby fixed in the closed position. The longitudinal gap 68 allows the latch mechanisms 49 to re-engage the doors 42 and also allows remaining particulate material to fall through the gap 68, into the passageway 44, and into the hopper 24. The lid 36 may then be moved to cover the top opening 38 of the chute assembly 30, thereby preventing particulate material from flying out of the hopper 24. The lid 36 also protects the hopper 24 from the elements.

As is now apparent, the use of the dispensing system 20 of the present invention allows material to be dispensed from a container into a hopper 24 for subsequent distribution therefrom, while eliminating the need for the operator to come into contact with the material when opening the container, filling the hopper, and dispensing material therefrom. Exposure of the operator to dust or airborne particles is minimized.

In addition, the operator is protected from accidental injury resulting from contact with a cutting device because the doors 42 of the present invention are fixed in a closed position unless the latch mechanism 49 is disengaged. Manual disengagement of the latch mechanism 49 requires the use of both hands since each of the main body members 76 are positioned on opposing end walls 52 of the main body 34 of the chute 30, thus it is difficult to contact the cutting subassembly 50 when the operator's hands are busy disengaging the latches 49. This feature helps prevent injury as a result of contacting the cutting subassembly 50.

When constructed of nylon/poly composite material, or a similar material, once emptied of its contents, the empty liner 104 may be crushed for easy transport and incineration in an environmentally safe manner. When the outer container 100 and the insert 102 are constructed of cardboard, the outer container 100 and the insert 102 may be incinerated, recycled, or biodegraded, like other cardboard products.

In addition, when manufactured in accordance with the preferred embodiment described herein, the triple-walled cardboard configuration of the container 30 provides sufficient support to the contents of the liner 104 without need for additional support structures such as bands, pallets or panels.

A presently preferred embodiment of the present invention and many of its improvements have been described with a degree of particularity. It should be understood that this description has been made by way of preferred example, and that the invention is defined by the scope of the following claims.

What is claimed is:

1. A dispensing system for dispensing a material from an upwardly directed hopper, comprising:
    a container, said container including:
        an outer container having outer walls defining a chamber, said outer container having an upper end and an opposing lower end, said lower end and adjacent portions of said outer wall defining a lower portion of said outer container and said upper end and adjacent portions of said outer wall defining an upper portion of said outer container;
        means for removing said lower portion of said outer container from said upper portion of said outer container;
        an insert having inner walls extending to form a lower peripheral edge and defining a passageway of said insert, said inner walls of said insert facing said outer walls of said outer container, with said lower peripheral edge defining an aperture adjacent said lower end of said outer container; and
        a liner positioned in said passageway and extending across said aperture, and adapted to contain the material to be dispensed; and
    a chute assembly comprising:
        a body member defining a top opening, a bottom opening, and a passageway of said chute therebetween, with said bottom opening positionable over said hopper;
        a cutting assembly positioned in said chute assembly and extending across said bottom opening;
        a door pivotally connected to the body member and moveable between a closed position and an open position, the door being normally biased in the closed position and covering said top opening; and
        a releasable latch securing said door in said closed position;
        wherein after said bottom portion of said container is removed from said container to expose a portion of said liner, and said container is positioned over and inserted into said top opening of said chute assembly with the exposed liner portion oriented toward the bottom opening of said chute assembly, said latch automatically releases, allowing said door to move to said open position, said container to slide downward into said chute assembly passageway, said liner to contact said cutting assembly and thereby create an opening in said liner through which said material flows into said chute assembly passageway and into said hopper.

2. A system as defined in claim 1, wherein said outer container has an inner side, and wherein said means for removing said lower portion of said outer container from said upper portion of said outer container comprises:
    a perforation formed through said outer container in a line continuous around said outer container, said perforation delineating said upper and lower portions;
    a flexible strip member having a first end and being positioned coextensive with said perforation on said inner side of said outer container; and
    wherein said first end of said strip member is pulled along and through said perforation around said outer container to separate said upper and lower portions.

3. A system as defined in claim 1, wherein:
    said lower peripheral edge defines a wedge shape between said inner wall and said aperture to facilitate the complete dispensing of the material from said container.

4. A system as defined in claim 1, further comprising:

two doors, each defining an inner and outer longitudinal edge, and being pivotally attached to said body member along said outer longitudinal edge, said doors pivotable between a closed position covering said top opening, wherein said inner longitudinal edges are adjacent to one another and both doors lie in substantially the same plane, and an open position uncovering said top opening wherein said doors extend vertically downwardly along said main body member.

5. A system as defined in claim 4, wherein a gap is formed between said longitudinal edges of said doors when said doors are in the closed position.

6. A system as defined in claim 5, wherein:

said doors define a bottom layer; and wherein said latch comprises:
- a main body member defining a top end and a bottom end, and being pivotally attached at said top end to said body member of said chute assembly adjacent said top opening, said bottom end defining a cross bar extending outwardly therefrom;
- said main body member moveable between an upper position and a lower position, said main body member being resiliently biased to said upper position; and
- said main body member extending downwardly from said top opening to extend beneath said doors, said cross bar engaging said bottom layer of said doors in the upper position, and said cross bar free of said bottom layer of said doors in the lower position.

7. A system as defined in claim 6, wherein:

said main body member extends through said gap between said inner longitudinal edges of said doors in said upper position; and said main body member extends substantially downwardly along said body member of said chute assembly when in said lower position.

8. A system as defined in claim 5, wherein the top layers of the doors slope downwardly toward said gap when in the closed position.

9. A system as defined in claim 7, wherein said main body member defines an inwardly and upwardly facing cam surface for engagement by said container to move said main body member from said upper position in engagement with said lower layers of said doors to said lower position.

10. A system as defined in claim 9, wherein a latch is positioned at either end of said chute assembly adjacent to said gap.

11. A chute assembly for dispensing a material into an upwardly directed hopper, comprising:

a body member defining a top opening, a bottom opening, and a passageway of said chute therebetween, with said bottom opening positionable over said hopper;

a cutting assembly positioned in said chute assembly and extending across said bottom opening;

a door pivotally connected to the body member and moveable between a closed position and an open position, the door being normally biased in the closed position and covering said top opening; and a releasable latch securing said door in said closed position.

12. A chute assembly as defined in claim 11, further comprising:

two doors, each defining an inner and outer longitudinal edge, and being pivotally attached to said body member along said outer longitudinal edge, said doors pivotable between a closed position covering said top opening, wherein said inner longitudinal edges are adjacent to one another and both doors lie in substantially the same plane, and an open position uncovering said top opening wherein said doors extend vertically downwardly along said main body member.

13. A chute assembly as defined in claim 12, wherein a gap is formed between said longitudinal edges of said doors when said doors are in the closed position.

14. A chute assembly as defined in claim 13, wherein:

said doors define a bottom layer; and wherein said latch comprises:
- a main body member defining a top end and a bottom end, and being pivotally attached at said top end to said body member of said chute assembly adjacent said top opening, said bottom end defining a cross bar extending outwardly therefrom;
- said main body member moveable between an upper position and a lower position, said main body member being resiliently biased to said upper position; and
- said main body member extending downwardly from said top opening to extend beneath said doors, said cross bar engaging said bottom layer of said doors in the upper position, and said cross bar free of said bottom layer of said doors in the lower position.

15. A chute assembly as defined in claim 14, wherein:

said main body member extends through said gap between said inner longitudinal edges of said doors in said upper position; and said main body member extends substantially downwardly along said body member of said chute assembly when in said lower position.

16. A chute assembly as defined in claim 13, wherein the top layers of the doors slope downwardly toward said gap when in the closed position.

17. A chute assembly as defined in claim 15, wherein said main body member defines an inwardly and upwardly facing cam surface for engagement by said container to move said main body member from said upper position in engagement with said lower layers of said doors to said lower position.

18. A container adapted for containing particulates and dispensing particulates therefrom, said container comprising:

an outer container having outer walls defining a chamber, said outer container having an upper end and an opposing lower end, said lower end and adjacent portions of said outer wall defining a lower portion of said outer container and said upper end and adjacent portions of said outer wall defining an upper portion of said outer container;

means for removing said lower portion of said outer container from said upper portion of said outer container;

an insert having inner walls extending to form a lower peripheral edge and defining a passageway of said insert, said inner walls of said insert facing said outer walls of said outer container, with said lower peripheral edge defining an aperture adjacent said lower end of said outer container; and a liner positioned in said passageway and adapted to contain the material to be dispensed.

19. A container according to claim 18, wherein the inner wall includes wedge-shaped portions adjacent to said aperture adapted for funneling said particulates into said chute passageway.

20. A container according to claim 19, wherein said outer container has an inner side, and wherein said means for removing said lower portion of said outer container from said upper portion of said outer container comprises:

a perforation formed through said outer container in a line continuous around said outer container, said perforation delineating said upper and lower portions;

a flexible strip member having a first end and being positioned coextensive with said perforation on said inner side of said outer container; and wherein said first end of said strip member is pulled along and through said perforation around said outer container to separate said upper and lower portions.

* * * * *